United States Patent
Bueb et al.

(10) Patent No.: US 12,475,068 B2
(45) Date of Patent: Nov. 18, 2025

(54) MULTI-INTERFACE MEMORY

(71) Applicant: Micron Technology, Inc., Boise, ID (US)

(72) Inventors: Christopher J. Bueb, Folsom, CA (US); Aravind Ramamoorthy, Rocklin, CA (US); Wanmo Wong, Menlo Park, CA (US)

(73) Assignee: Micron Technology, Inc., Boise, ID (US)

( * ) Notice: Subject to any disclaimer, the term of this patent is extended or adjusted under 35 U.S.C. 154(b) by 21 days.

(21) Appl. No.: 17/945,827

(22) Filed: Sep. 15, 2022

(65) Prior Publication Data

US 2024/0095199 A1    Mar. 21, 2024

(51) Int. Cl.
*G06F 13/16*    (2006.01)

(52) U.S. Cl.
CPC ...... *G06F 13/1694* (2013.01); *G06F 13/1657* (2013.01); *G06F 13/1689* (2013.01)

(58) Field of Classification Search
CPC .......... G06F 13/1694; G06F 13/1657; G06F 13/1689; G06F 13/364; G06F 13/20; G06F 13/16
See application file for complete search history.

(56) References Cited

U.S. PATENT DOCUMENTS

| | | | |
|---|---|---|---|
| 7,520,438 B2 | 4/2009 | Kim et al. | |
| 10,185,515 B2 * | 1/2019 | Shin | G06F 3/0658 |
| 11,360,707 B2 | 6/2022 | Seo et al. | |
| 11,907,587 B2 * | 2/2024 | Sreedhar | G06F 3/0676 |
| 12,067,235 B2 * | 8/2024 | Chen | G06F 3/0607 |
| 2009/0037657 A1 * | 2/2009 | Bresniker | G06F 13/1694 |
| | | | 711/E12.083 |
| 2010/0299513 A1 * | 11/2010 | Ryu | G06F 11/1441 |
| | | | 711/6 |
| 2014/0082260 A1 * | 3/2014 | Oh | G06F 12/0246 |
| | | | 711/103 |
| 2014/0122777 A1 * | 5/2014 | Oh | G06F 3/061 |
| | | | 711/103 |
| 2016/0328347 A1 * | 11/2016 | Worley | G06F 13/385 |
| 2019/0138440 A1 * | 5/2019 | Lee | G06F 3/0679 |
| 2020/0409832 A1 * | 12/2020 | Bueb | G06F 12/0284 |
| 2021/0349783 A1 * | 11/2021 | Dunn | G11C 11/40615 |

(Continued)

FOREIGN PATENT DOCUMENTS

| | | | | |
|---|---|---|---|---|
| WO | WO-2019156853 A1 * | 8/2019 | ....... | G11C 11/40615 |
| WO | WO-2021096726 A1 * | 5/2021 | ......... | G06F 13/4282 |

OTHER PUBLICATIONS

"A NAND Flash Memory Controller Exporting a NAND Interface", An IP.com Prior Art Database Technical Disclosure, IPCOM000141594D, Oct. 10, 2006.*

(Continued)

*Primary Examiner* — Pierre Michel Bataille
(74) *Attorney, Agent, or Firm* — Brooks, Cameron & Huebsch, PLLC

(57) ABSTRACT

A multi-interface memory can include a memory package that includes a memory device and host interfaces coupled to the memory device. Each of the host interfaces is configured to operate according to a different protocol. The memory package can be coupled to a host via one or more of the host interfaces. More than one of the host interfaces can share a contact.

15 Claims, 4 Drawing Sheets

(56) References Cited

U.S. PATENT DOCUMENTS

| | | | |
|---|---|---|---|
| 2022/0179586 A1* | 6/2022 | Balakrishnan | G06F 3/064 |
| 2022/0269629 A1* | 8/2022 | Pinto | G06F 13/387 |
| 2022/0398046 A1* | 12/2022 | Sreedhar | G06F 3/0661 |
| 2023/0169028 A1* | 6/2023 | Chen | G06F 13/385 |
| | | | 710/315 |
| 2023/0176733 A1* | 6/2023 | Chen | G06F 3/0688 |
| | | | 711/117 |

OTHER PUBLICATIONS

H. Michel et al., "The SoCWire protocol (SoCP): A flexible and minimal protocol for a Network-on-Chip," 2012 NASA/ESA Conference on Adaptive Hardware and Systems (AHS), Erlangen, Germany, 2012, pp. 1-8.*

S. Hong, W.-O. Kwon and M.-H. Oh, "Hardware Implementation and Analysis of Gen-Z Protocol for Memory-Centric Architecture," in IEEE Access, vol. 8, pp. 127244-127253, 2020.*

C. A. Lupini, "Advantages of integrating a serial data link controller with CPU (vehicles)," [1992 Proceedings] Vehicular Technology Society 42nd VTS Conference—Frontiers of Technology, Denver, CO, USA, 1992, pp. 1051-1055 vol. 2.*

Cooke, "Simplify your flash-memory interface", CommsDesign, Sep. 25, 2006, 3 pages, http://www.maltiel-consulting.com/flash-memory-interface-ONFI-support-ECC.htm.

* cited by examiner

MULTI-INTERFACE MEMORY

TECHNICAL FIELD

The present disclosure relates generally to semiconductor memory and methods, and more particularly, to apparatuses, systems, and methods for multi-interface memory.

BACKGROUND

A memory package can include one or more memory devices that store data. The memory devices can be, for example, non-volatile memory devices and/or volatile memory devices. In general, a host can utilize a memory package to store data at the memory devices and to retrieve data from the memory devices.

Solid state storage devices including non-volatile memory typically include a controller and various memory devices (e.g., non-volatile memory chips) integrated into a memory package. The cost of the controller plus package assembly has typically been a small fraction of the cost of the overall assembly.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
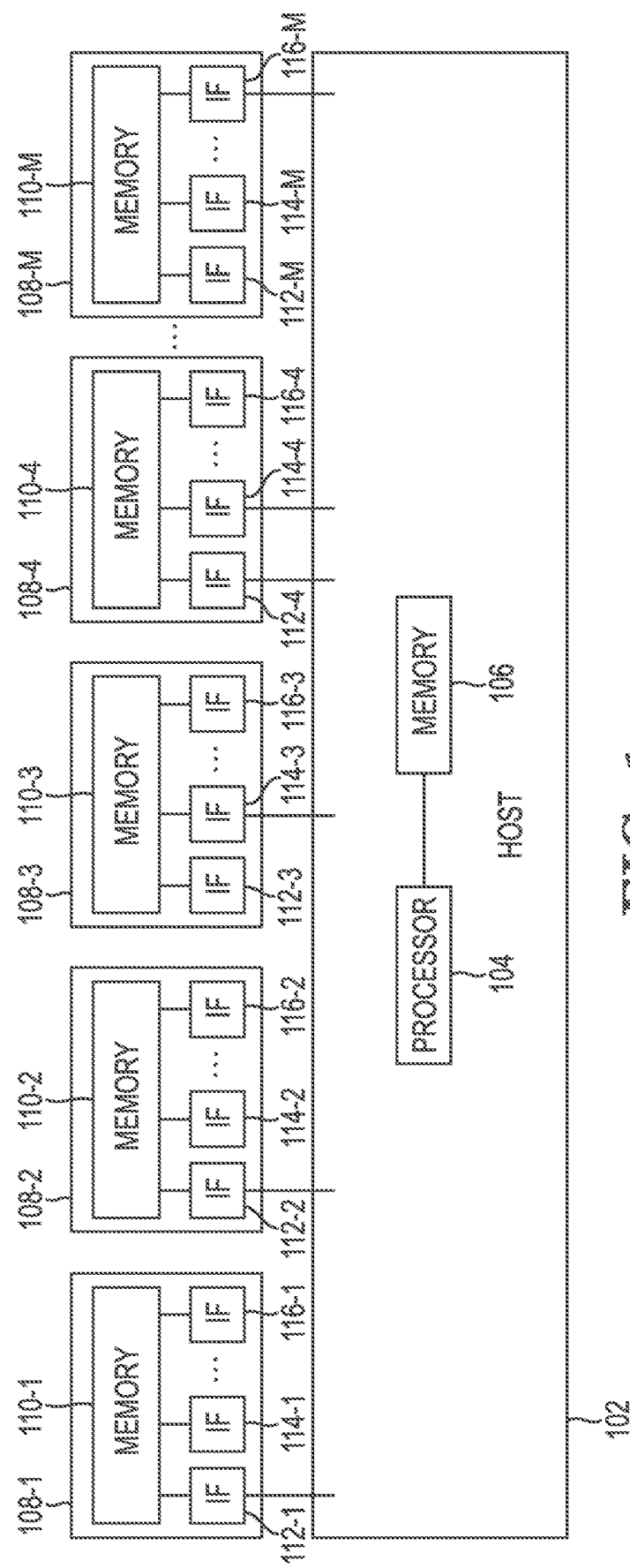
FIG. 1 is a block diagram of an example of a system including multi-interface memory packages in accordance with some embodiments of the present disclosure.

Aspects of the present disclosure are directed to multi-interface memory. As non-volatile memory technology has advanced without a corresponding need for increased density in many applications, the cost of the controller plus package assembly has been increasing as a percentage of the overall cost. Also, the cost of the controller plus package assembly does not scale down as rapidly with advancing technology, as does the non-volatile memory. The net effect is that host system developers are required to pay a higher price for their storage devices and/or storage device manufacturers receive less profit.

Aspects of the present disclosure address the above and other deficiencies by reducing the cost of the controller plus package assembly. Some previous approaches to such cost reductions were accomplished by reducing the controller complexity, which often resulted in reduced performance. Often, the controller (and new interface) was integrated into the non-volatile storage chip, which improved the package assembly cost. But as non-volatile memory technology advanced, it became necessary to enhance the integrated controller, which increased the non-volatile memory die size and cost. With the benefit of hindsight, new interface standards were introduced that improved the performance and reduced cost. However, the new standards were not compatible with the existing host systems. At least one embodiment of the present disclosure provides a memory package with multiple host interfaces to allow the host to gain the advantage of multiple interfaces without requiring an additional storage device. In some embodiments, the multiple interfaces can follow existing interface standards.

Chipset vendors for host systems may attempt to improve their revenue by supporting as many storage device interfaces as practical to reach as wide of a market as possible. The multiple storage interfaces give system developers more options when procuring storage devices. As a general practice, many of the available interfaces on the chipset (and host system) go unused. At least one embodiment of the present disclosure that includes a multi-interface memory package better enables system developers to use more than one (but in some cases not all) available interfaces to achieve performance and bootability benefits from a wider choice of interfaces. For chipsets that multiplex signals (e.g., high speed data and/or clock signals), the multi-interface memory package can multiplex the same signals, which reduces the contact (e.g., pin, pad, etc.) requirements of the storage device.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Analogous elements within a Figure may be referenced with a hyphen and extra numeral or letter. Such analogous elements may be generally referenced without the hyphen and extra numeral or letter. For example, elements 108-1, 108-2, 108-3, 108-4, . . . , 108-M in FIG. 1 may be collectively referenced as 108. As used herein, the designators "M", "N", and "S" particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an example of a system including multi-interface memory packages 108-1, 108-2, 108-3, 108-4, . . . , 108-M in accordance with some embodiments of the present disclosure. The system can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The system includes a host 102 that is coupled to one or more memory packages 108. The host 102 includes or is coupled to a processor 104 and memory 106. The processor 104 can include one or more processor chipsets, which can execute a software stack. The processor 106 can include one or more cores, one or more caches, a memory controller (e.g., NVDIMM controller), and a storage protocol controller (e.g., PCIe controller, SATA controller, etc.). The host 102 uses the memory 106, for example, to write data to the memory packages 108 and read data from the memory packages 108. The memory 106 can be main memory, which may be volatile memory. For example, the memory 106 can be random access memory (RAM), such as dynamic random access memory (DRAM), synchronous dynamic random access memory (SDRAM), and resistive DRAM (RDRAM). As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host 102 can be coupled to several multi-interface memory packages 108. As illustrated, each memory package includes three different types of host interfaces 112, 114, 116, however embodiments are not so limited. Some memory packages 108 may have more or less host interfaces. Each of the host interfaces 112, 114, 116 of a particular memory package 108 is coupled to the memory device 110 of the particular memory package 108. For example, the memory device 110-1 of the first memory package 108-1 is coupled to the first host interface 112-1, the second host interface 114-1, and the third host interface 116-1.

In the example illustrated in FIG. 1, the first memory package 108-1 includes a first type of host interface 112-1, a second type of host interface 114-1, and a third type of host interface 116-1. The second memory package 108-2 includes the first type of host interface 112-2, the second type of host interface 114-2, and the third type of host interface 116-2. The third memory package 108-3 includes the first type of host interface 112-3, the second type of host interface 114-3, and the third type of host interface 116-3. The fourth memory package 108-4 includes the first type of host interface 112-4, the second type of host interface 114-4, and the third type of host interface 116-4. The Mth memory package 108-M includes the first type of host interface 112-M, the second type of host interface 114-M, and the third type of host interface 116-M.

In FIG. 1, the host 102 is coupled to a first memory package 108-1 via a first type of interface 112-1, to a second memory package 108-2 via the first type of interface 112-2, to a third memory package 108-3 via a second type of interface 114-3, to a fourth memory package 108-4 via the first and the second types of interfaces 112-4, 114-4, and to an Mth memory package 108-M via a third type of memory interface 116-M. The host 102 can be coupled to a particular memory package 108-1 via only one host interface 112-1. The host 102 can be coupled to a particular memory package 108-4 via more than one of the host interfaces 112-4, 114-4. In the example illustrated in FIG. 1, each of the memory packages 108 includes three different types of host interfaces 112, 114, 116, however, embodiments are not so limited, as different memory packages may have different quantities and types of host interfaces. In some embodiments, each memory package 108 can include the same types of host interfaces 112, 114, 116. In some embodiments, different memory packages can include different types of host interfaces 112, 114, 116.

The host 102 can be coupled to the memory packages 108 via physical host interfaces 112, 114, 116. Examples of the physical host interfaces include, but are not limited to, Open NAND Flash Interface (ONFI), embedded Multi-Media Controller (eMMC) interface, serial peripheral interface (SPI) serial advanced technology attachment (SATA) interface, PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Double Data Rate (DDR), Low Power Double Data Rate (LPDDR), or any other interface. The physical host interfaces can be used to transmit data between the host 102 and the memory packages 108. The host 102 can further utilize an NVM Express (NVMe) interface to access a memory package 108 when the memory package 108 is coupled to the host 102 by a PCIe interface. The physical host interface can provide an interface for passing control, address, data, and other signals between the memory packages 108 and the host 102.

The host 102 can send requests to the memory packages 108, for example, to store data in the memory packages 108 or to read data from the memory packages 108. The data to be written or read, as specified by a host request, is referred to as "host data." A host request can include logical address information. The logical address information can be a logical block address (LBA), which may include or be accompanied by a partition number. The logical address information is the location the host system associates with the host data. The logical address information can be part of metadata for the host data. The LBA may also correspond (e.g., dynamically map) to a physical address, such as a physical block address (PBA), that indicates the physical location where the host data is stored in memory.

The memory packages 108 can include memory devices 110-1, 110-2, 110-3, 110-4, . . . , 110-M, such as non-volatile memory devices. The memory packages 108 can be storage devices, memory modules, or hybrids of storage devices and memory modules. Examples of a storage device include a solid state drive (SSD), a flash drive, a universal serial bus (USB) flash drive, an eMMC drive, a Universal Flash Storage (UFS) drive, a secure digital (SD) card, and a hard disk drive (HDD). In at least one embodiment, the memory packages 108 are automotive grade SSDs. Examples of memory modules include a dual in-line memory module (DIMM), a small outline DIMM (SO-DIMM), and various types of non-volatile dual in-line memory module (NVDIMM).

An example of the memory devices 110 is not-and (NAND) type flash memory. NAND type flash memory includes, for example, two-dimensional NAND (2D NAND) and three-dimensional NAND (3D NAND). The memory devices 110 can be other types of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), and three-dimensional cross-point memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the memory devices 110 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 110 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 110 can be grouped as pages that can refer to a logical unit of the memory device used to store data. With some types of memory (e.g., NAND), pages can be grouped to form blocks.

Although not specifically illustrated, one or more of the memory packages 108 can include a controller that can communicate with the memory devices 110 to perform operations such as reading data, writing data, erasing data, and other such operations. The controller can include hardware such as one or more integrated circuits and/or discrete components, a buffer memory, or a combination thereof. The hardware can include a digital circuitry with dedicated (i.e., hard-coded) logic to perform the operations described herein. The controller can be a microcontroller, special purpose logic circuitry (e.g., a field programmable gate array (FPGA), an application specific integrated circuit (ASIC), etc.), or other suitable circuitry. Memory packages 108 without a controller can rely upon external control (e.g., provided by the host 102, or by a processor or controller separate from the memory package 108).

In general, the controller can receive information or operations from the host 102 and can convert the information or operations into instructions or appropriate information to achieve the desired access to the memory devices 110. The controller can be responsible for other operations such as media management operations (e.g., wear leveling operations, garbage collection operations, defragmentation operations, read refresh operations, etc.), error detection and/or correction operations, encryption operations, caching operations, and address translations between a logical address (e.g., logical block address) and a physical address (e.g., physical block address) associated with the memory devices 110.

Although not specifically illustrated, one or more of the memory packages 108 can include local memory (e.g., volatile memory). The controller can include a processor configured to execute instructions stored in local memory. The local memory can be embedded in a controller of the memory package 108 (if so equipped). The local memory can be configured to store instructions for performing various processes, operations, logic flows, and routines that control operation of the memory packages 108, including handling communications between the memory packages 108 and the host 102.

Figure 2:
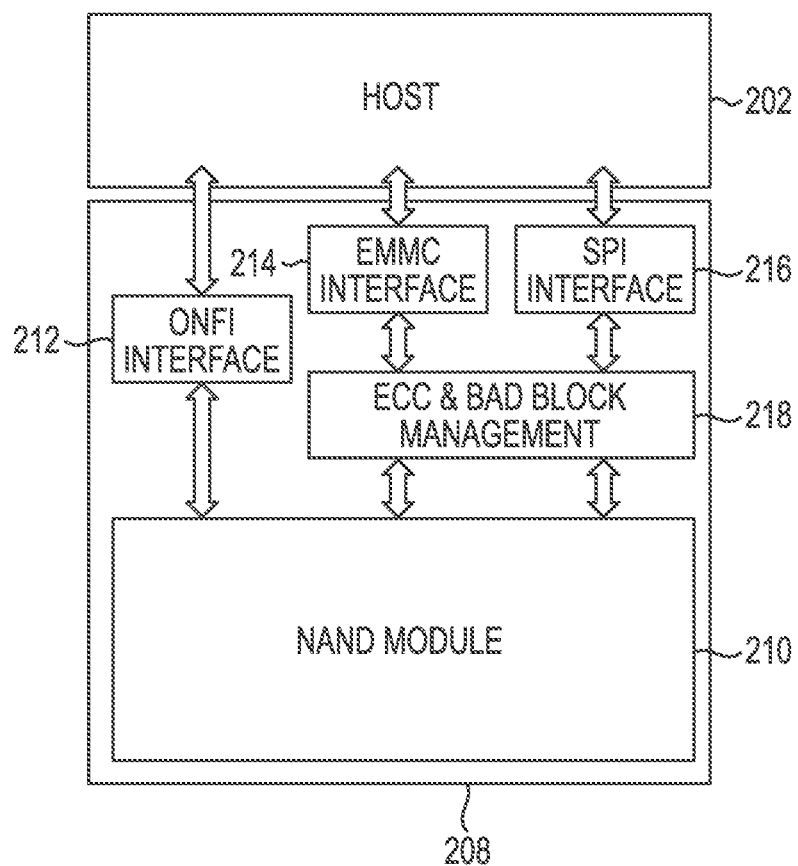
FIG. 2 is a block diagram of an example of a system including a multi-interface memory package in accordance with some embodiments of the present disclosure.

FIG. 2 is a block diagram of an example of a system including a multi-interface memory package 208 in accordance with some embodiments of the present disclosure. The multi-interface memory package 208 can be coupled to the host 202 via one or more of a first host interface 212, a second host interface 214, and a third host interface 216, each of which is configured to operate according to a different protocol. Each of the host interfaces 212, 214, 216 can have a different physical layer. In some embodiments, one or more of the different physical layers of the different host interfaces 212, 214, 216 can be standardized physical layers.

The host interfaces 212, 214, 216 can each be a respective standardized host interface. In this example, the first host interface 212 is an ONFI interface, the second host interface 214 is an eMMC interface, and the third host interface 216 is a SPI interface. In at least one embodiment, the host 202 does not have individual chip selects for each individual host interface 212, 214, 216. As described in more detail with respect to FIG. 3, at least two of the host interfaces 212, 214, 216 can share a contact.

One benefit of the multi-interface memory package 208 is that the host 202 can use different interfaces of the same memory package 208 for different operations. For example, the host 202 can use the third host interface 216 (e.g., SPI) to provide a fast boot operation and then switch to using the second host interface 214 (e.g., eMNIC) to provide higher speed data transfer after the boot operation is complete. The host 202 can use different interfaces of the memory package 208 for different operations to advantageously take advantage of varying speeds, levels of power consumption, or other characteristics of the different host interfaces 212, 214, 216 that provide a relative benefit for different operations of the host 202.

All three host interfaces 212, 214, 216 are coupled to the memory device 210, which in this example is a NAND module. Although only one memory device 210 is illustrated, some embodiments include more than one memory device, such as solid state non-volatile memory devices. In some embodiments, the memory device 210 is a relatively lower performance and/or older legacy memory device relative to a more modern state-of-the-art memory device. That the memory package 208 includes multiple host interfaces 212, 214, 216 makes the relatively lower performance memory device 210 more marketable and likely to be used with a given host 202.

The second host interface and/or the third host interface are coupled to the memory device 210 via a memory management circuit 218, which in this example is error correction code (ECC) and bad block management circuitry. The memory management circuit 218 can be configured to perform memory management operations on data from the memory device 210 before the data is transferred across either of the second host interface 214 or the third host interface 216.

Figure 3:
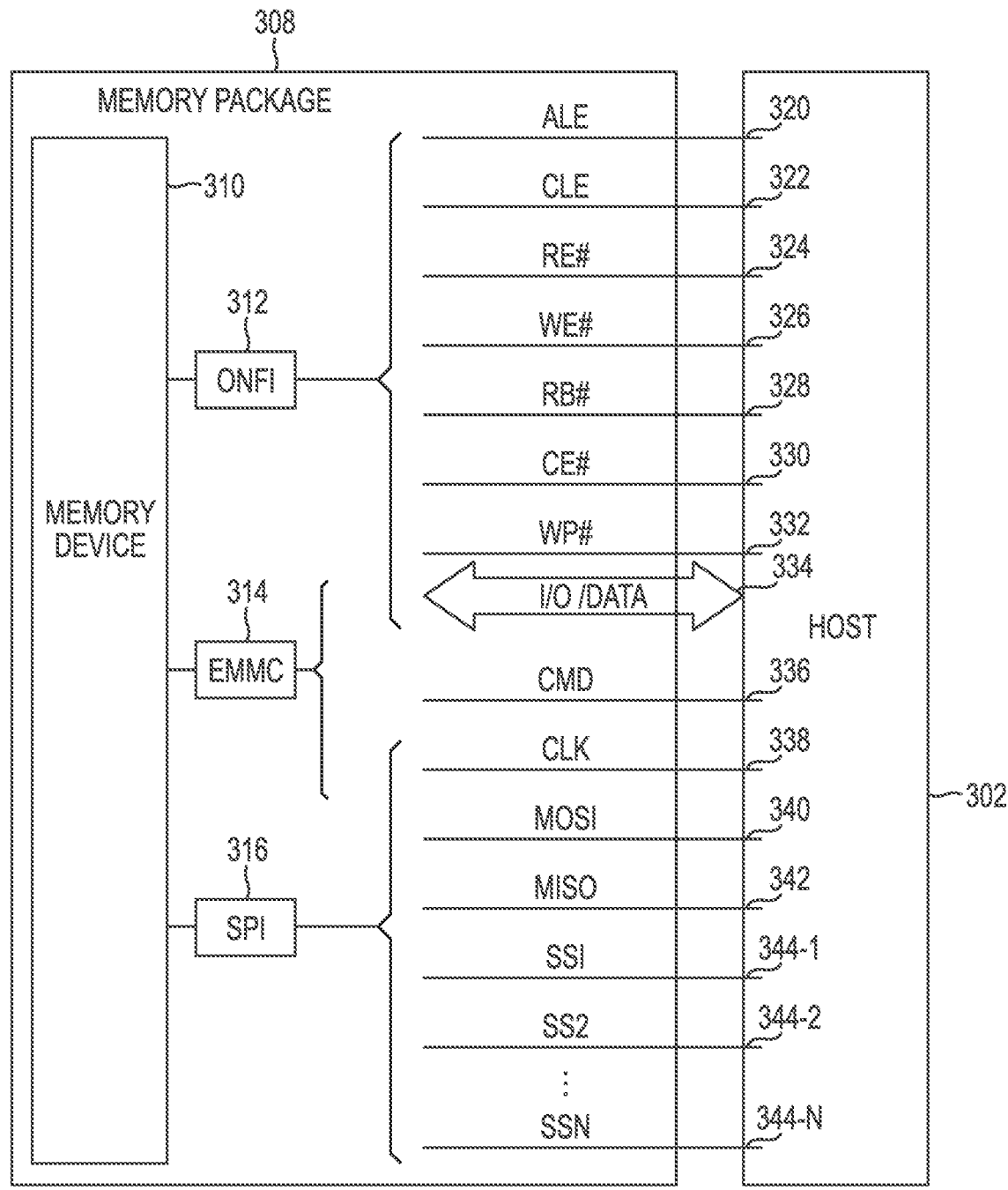
FIG. 3 is a block diagram of an example of a system including a multi-interface memory package with shared contacts in accordance with some embodiments of the present disclosure.

FIG. 3 is a block diagram of an example of a system including a multi-interface memory package 308 with shared contacts in accordance with some embodiments of the present disclosure. The memory package 308 includes one or more memory devices 310 (illustrated as one memory device 310 for simplicity) coupled to multiple host interfaces 312, 314, 316. Each of the host interfaces 312, 314, 316 is illustrated both as a block and as a number of contacts. The contacts for each interface are indicated by the brackets connected to the host interface blocks.

As a non-limiting example, the first host interface 312, which can be an ONFI interface, includes an address latch enable (ALE) contact 320, a command latch enable (CLE) contact 322, a read enable (RE #) contact 324, a write enable (WE #) contact 326, a read busy (RB #) contact 328, a command enable (CE #) contact 330, a write protect (WP #) contact 332, and an input/output (I/O) and/or data bus 334, which can include more than one contact depending on the width of the bus. Signals sent across the ALE contact 320 can control writing to an address register. Signals sent across the CLE contact 322 can control writing to a command register. Signals sent across the RE #contact 324 can control the data and status output on the I/O and/or data bus 334. Signals sent across the WE #contact 326 can control the data and command on the I/O and/or data bus 334 during a write operation. Signals sent across the RB #contact 328 can indicate whether the memory device 310 is ready or busy.

Signals sent across the CE #contact 330 can control the active and standby modes of the chip. Although not specifically illustrated, the CE #contact 330 can be shared by multiple host interfaces. Signals sent across the WP #contact 322 can provide protection when programming or erasing operations are being performed on the memory device 310. Signals sent across the I/O and/or data bus 334 can be indicative of data being transferred to or from the memory device 310.

As a non-limiting example, the second host interface 314, which can be an eMMC interface, includes the I/O and/or data bus 334, a command (CMD) contact 336, and a clock contact (CLK) 338. The clock contact 338 can be a high speed serial clock. The I/O and/or data bus 334 (e.g., the contacts comprising the I/O and/or data bus 334) can be shared between the first host interface 312 and the second host interface 314.

As a non-limiting example, the third host interface 316, which can be a SPI interface, includes the CLK contact 338, a master-out secondary-in (MOSI) contact 340, a master-in secondary-out (MISO) contact 342, and a number of chip select (SS1, SS2, . . . , SSN) contacts 344-1, 344-2, . . . , 344-N, which may also be referred to in the art as secondary selects (or slave selects) because the SPI interface can also be connected to different memory chips downstream of the memory package 308 in a serial configuration (e.g., independent secondary, daisy chain, or expander configuration). The secondary chips are not specifically illustrated, but are secondary to the memory package 308 illustrated in FIG. 3. The CLK contact 338 can be shared between the second host interface 314 and the third host interface 316.

The first host interface 312, the second host interface 314, and the third host interface 316 can be coupled to the memory device 310. The first host interface 312 can include a first data contact (e.g., I/O and/or data bus 334) and a first control contact (e.g., CLE contact 322). The second host interface 314 can include the first data contact (e.g., I/O and/or data bus 334), a first clock contact (e.g., CLK contact 338), and a second control contact (e.g., CMD contact 336). The third host interface 316 can include the first clock contact (e.g., CLK contact 338), a second data contact (e.g., SS1 contact 344-1), and a third control contact (e.g., MISO contact 342). The memory package 308 can be configured to multiplex a clock signal on the first clock contact (e.g., CLK contact 338) via the second host interface 314 and the third host interface 316. The memory package 308 can be configured to multiplex signals on the I/O and/or data bus 334 via the first host interface 312 and the second host interface 314. Each of the host interfaces 312, 314, 316 can operate according to a different protocol. Although not specifically illustrated in FIG. 3, the memory package 308 can include a memory management circuit coupled to the memory device 310, the second host interface 314, and the third host interface 316, as described above with respect to FIG. 2. The memory management circuit may not be coupled to the first host interface 312.

Figure 4:
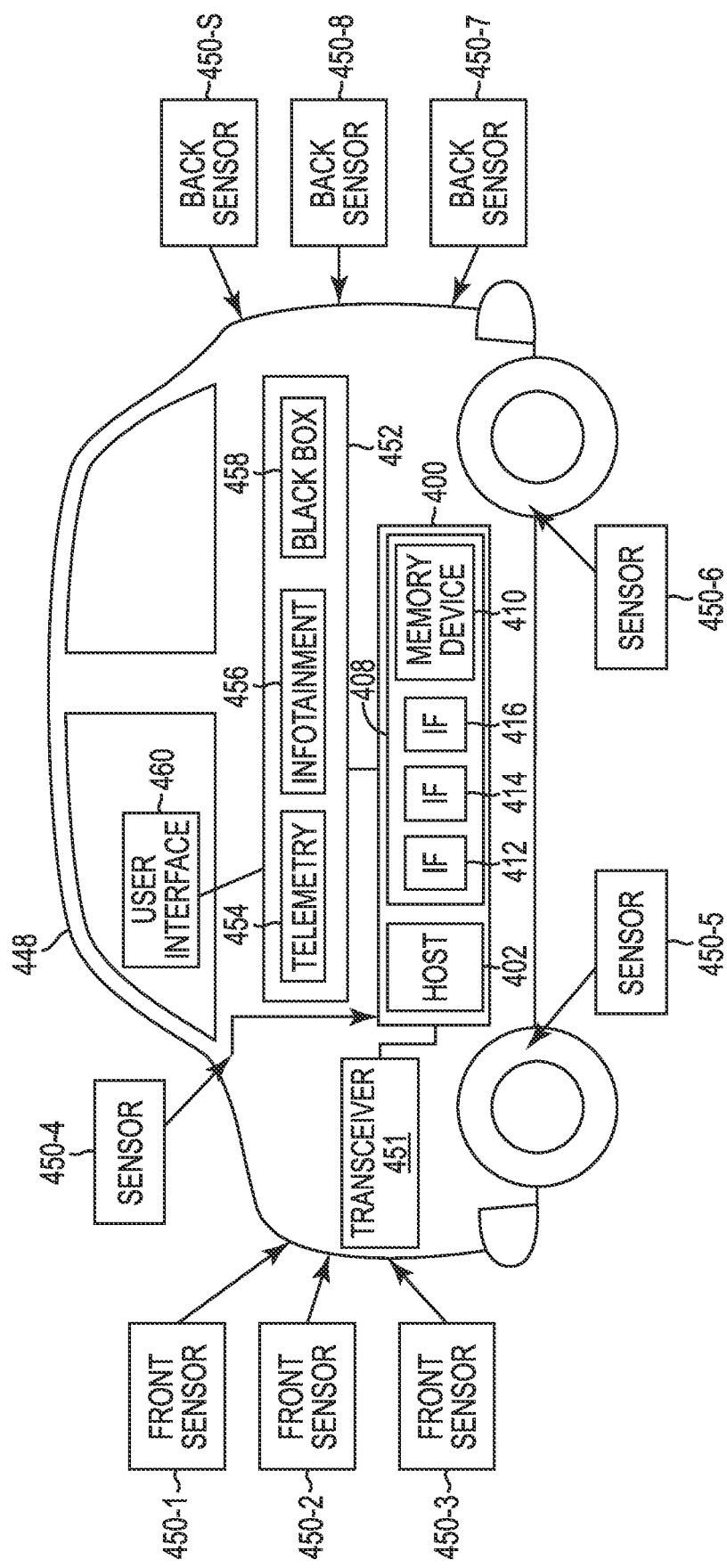
FIG. 4 illustrates an example of a system including a multi-interface memory package in a vehicle in accordance with some embodiments of the present disclosure.

FIG. 4 illustrates an example of a system including a multi-interface memory package 408 in a vehicle 448 in accordance with some embodiments of the present disclosure. The computing system 400 can include a memory package 408, which is illustrated as including a number of host interfaces 412, 414, 416 and a memory device 410. The memory package 408 is coupled to the host 402 via one or more of the multiple host interfaces 412, 414, 416.

The computing system 400, and thus the host 402, can be coupled to a number of sensors 450 either directly, as illustrated for the sensor 450-4 or via a transceiver 451 as illustrated for the sensors 450-1, 450-2, 450-3, 450-5, 450-6, 450-7, 450-8, . . . , 450-N. The transceiver 451 is able to receive data from the sensors 450 wirelessly, such as by radio frequency communication. In at least one embodiment, each of the sensors 450 can communicate with the computing system 400 wirelessly via the transceiver 451. In at least one embodiment, each of the sensors 450 is connected directly to the computing system 400 (e.g., via wires or optical cables).

The vehicle 448 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 450 are illustrated in FIG. 4 as including example attributes. For example, sensors 450-1, 450-2, and 450-3 are cameras collecting data from the front of the vehicle 448. Sensors 450-4, 450-5, and 450-6 are microphone sensors collecting data from the from the front, middle, and back of the vehicle 448. The sensors 450-7, 450-8, and 450-N are cameras collecting data from the back of the vehicle 448. As another example, the sensors 450-5, 450-6 are tire pressure sensors. As another example, the sensor 450-4 is a navigation sensor, such as a global positioning system (GPS) receiver. As another example, the sensor 450-6 is a speedometer. As another example, the sensor 450-4 represents a number of engine sensors such as a temperature sensor, a pressure sensor, a voltmeter, an ammeter, a tachometer, a fuel gauge, etc. As another example, the sensor 450-4 represents a camera. Video data can be received from any of the sensors 450 associated with the vehicle 448 comprising cameras. In at least one embodiment, the video data can be compressed by the host 402 before providing the video data to the memory package 408.

The host 402 can execute instructions to provide an overall control system and/or operating system for the vehicle 448. The host 402 can be a controller designed to assist in automation endeavors of the vehicle 448. For example, the host 402 can be an advanced driver assistance system (ADAS) controller. An ADAS can monitor data to prevent accidents and provide warning of potentially unsafe situations. For example, the ADAS can monitor sensors in the vehicle 448 and take control of vehicle 448 operations to avoid accident or injury (e.g., to avoid accidents in the case of an incapacitated user of a vehicle). The host 402 may need to act and make decisions quickly to avoid accidents. The memory package 408 can store reference data in the memory device 410 such that data from the sensors 450 can be compared to the reference data by the host 402 in order to make quick decisions.

The host 402 can write data received from one or more sensors 450 and store the data (e.g., in association with a black box application 458 for the vehicle). The black box application 458 may also be referred to as an accident data recorder. With the advent of autonomous vehicles, some autonomous driving requires real time buffering of telemetric data such as video cameras, RADAR, LIDAR, ultrasonic and other sensors necessary to playback the sequences preceding an accident. Upon an event, a quantity (e.g., thirty seconds) of playback time immediately preceding an event needs to be captured to determine the cause of an incident. A playback may be referred to as a "snapshot". The application that controls storage of such information is referred to herein as a black box. A black box may need to store at least a few, most recent snapshots.

The host 402 can execute instructions to provide a set of applications 452 for the vehicle 448 including telemetry 454, infotainment 456, and a black box 458. The telemetry application 454 can provide information displayable on a user interface 460 such as may be associated with the instrumentation and/or dashboard of a vehicle 448. An example of such telemetric information is the speed at which the vehicle 448 is traveling (e.g., based at least in part on data from a sensor 450). The infotainment application 456 can include information and/or entertainment for a user of the vehicle 448 displayable or interfaced via the user interface 460. Examples of such information and/or entertainment include music, movies, GPS information such as a moving map, etc. The memory package 408 can provide storage for any of the set of applications 452. The set of applications 452 can be virtualized with backing storage provided by the memory package 408.

The methods described herein can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Instructions can be executed by a processing device (e.g., one or more general-purpose processing devices such as a microprocessor, a central processing unit, or the like). More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device can also be one or more special-purpose processing devices such as an ASIC, an FPGA, a digital signal processor (DSP), network processor, or the like. The processing device is configured to execute instructions for performing the operations and steps discussed herein. In some embodiments, the instructions can be communicated over a network interface device to communicate over a network.

A machine-readable storage medium (also known as a computer-readable medium) can store one or more sets of instructions or software embodying one or more of the methodologies or functions described herein. The instructions can also reside, completely or at least partially, within main memory and/or within a processing device during execution thereof by a computing system. The main memory and the processing device can also constitute machine-readable storage media.

The term "machine-readable storage medium" should be taken to include a single medium or multiple media that store the one or more sets of instructions. The term "machine-readable storage medium" should also be taken to include a medium that is capable of storing or encoding a set of instructions for execution by the machine and that cause the machine to perform one or more of the methodologies of the present disclosure. The term "machine-readable storage medium" should accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a machine-readable storage medium, such as, but not limited to, types of disks, semiconductor-based memory, magnetic or optical cards, or other types of media suitable for storing electronic instructions.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer).

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
   a memory package, comprising:
      a memory device integrated into the memory package;
      a plurality of host interfaces integrated into the memory package and coupled to the memory device, wherein each of the plurality of host interfaces is configured to operate according to a different protocol; and
      a memory management circuit coupled to the memory device and to at least two of the plurality of host interfaces;
      wherein the memory management circuit is configured to perform memory management operations on data from the memory device before the data is transferred across either of the at least two of the plurality of host interfaces.

2. The apparatus of claim 1, wherein the memory package includes a plurality of memory devices; and
   wherein each of the plurality of memory devices is coupled to the plurality of host interfaces.

3. The apparatus of claim 2, wherein each of the plurality of memory devices comprises a respective solid state non-volatile memory device.

4. The apparatus of claim 1, wherein each of the plurality of host interfaces is a different standardized host interface.

5. The apparatus of claim 1, wherein at least two of the plurality of host interfaces share at least one contact.

6. A system, comprising:
a memory package, comprising:
a plurality of host interfaces integrated into the memory package; and
a memory device integrated into the memory package and coupled to the plurality of host interfaces; and
a host coupled to the memory package via more than one of the plurality of host interfaces, wherein the host is configured to:
receive data from the memory package using a first one of the plurality of host interfaces during a boot process; and
receive data from the memory package using a second one of the plurality of host interfaces after completion of the boot process.

7. The system of claim 6, further comprising a different memory package, comprising:
a plurality of different host interfaces; and
a different memory device coupled to the different plurality of host interfaces;
wherein the different memory package is coupled to the host via one of the plurality of different host interfaces.

8. The system of claim 7, wherein each of the plurality of host interfaces is a same type of host interface as a respective one of the plurality of different host interfaces.

9. The system of claim 6, wherein each of the plurality of host interfaces is configured to operate according to a different protocol.

10. The system of claim 6, wherein each of the plurality of host interfaces has a different standardized physical layer.

11. The system of claim 6, wherein at least two of the plurality of host interfaces share a contact.

12. An apparatus, comprising:
a memory package, comprising:
a memory device integrated into the memory package;
a first host interface integrated into the memory package and coupled to the memory device, the first host interface configured to operate according to a first protocol and comprising a first data contact and a first control contact;
a second host interface integrated into the memory package and coupled to the memory device, the second host interface configured to operate according to a second protocol and comprising the first data contact, a first clock contact, and a second control contact; and
a third host interface integrated into the memory package and coupled to the memory device, the third host interface configured to operate according to a third protocol and comprising the first clock contact, a second data contact, and a third control contact.

13. The apparatus of claim 12, wherein the memory package is configured to multiplex a clock signal on the first clock contact via the second host interface and the third host interface.

14. The apparatus of claim 13, wherein the first data contact comprises a data bus; and
wherein the memory package is configured to multiplex data signals on the data bus via the first host interface and the second host interface.

15. The apparatus of claim 12, further comprising a memory management circuit coupled to the memory device, the second host interface, and the third host interface;
wherein the memory management circuit is not coupled to the first host interface.

* * * * *